C. B. HOLLOMON.
MOWER CUTTER BAR.
APPLICATION FILED APR. 4, 1916.
1,310,339.
Patented July 15, 1919.
2 SHEETS—SHEET 1.
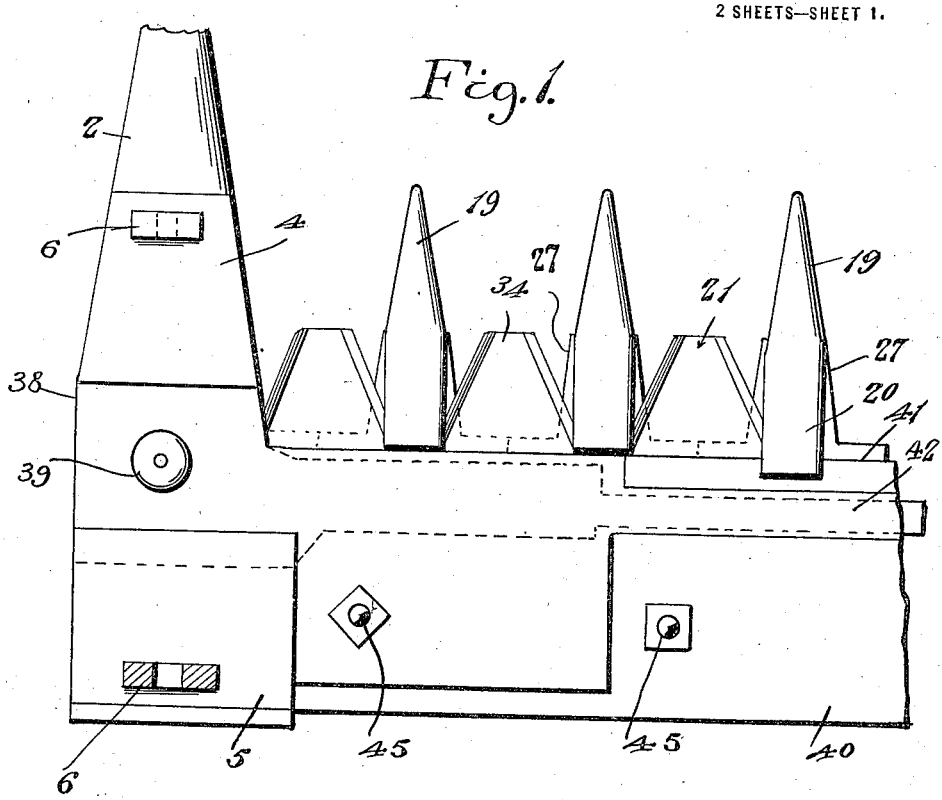
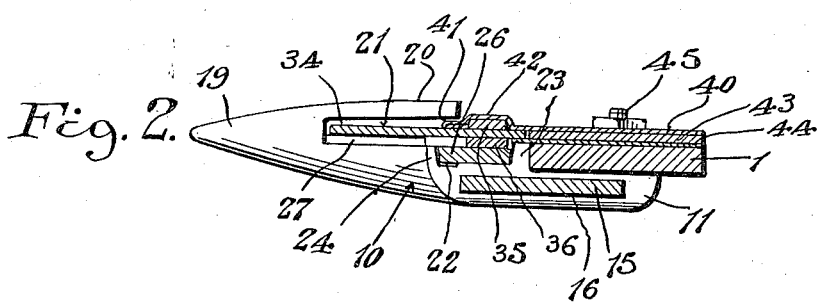
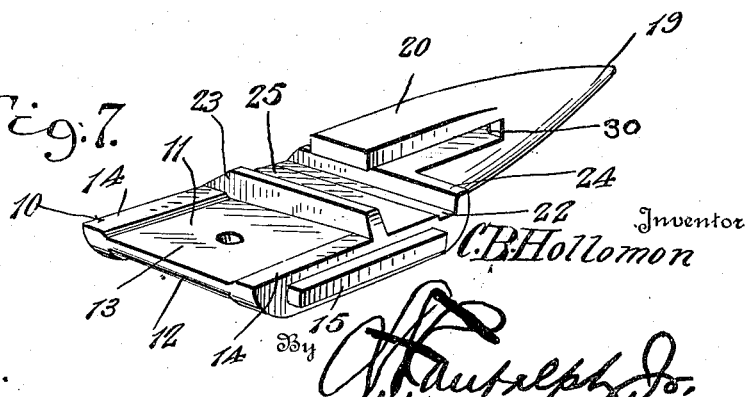

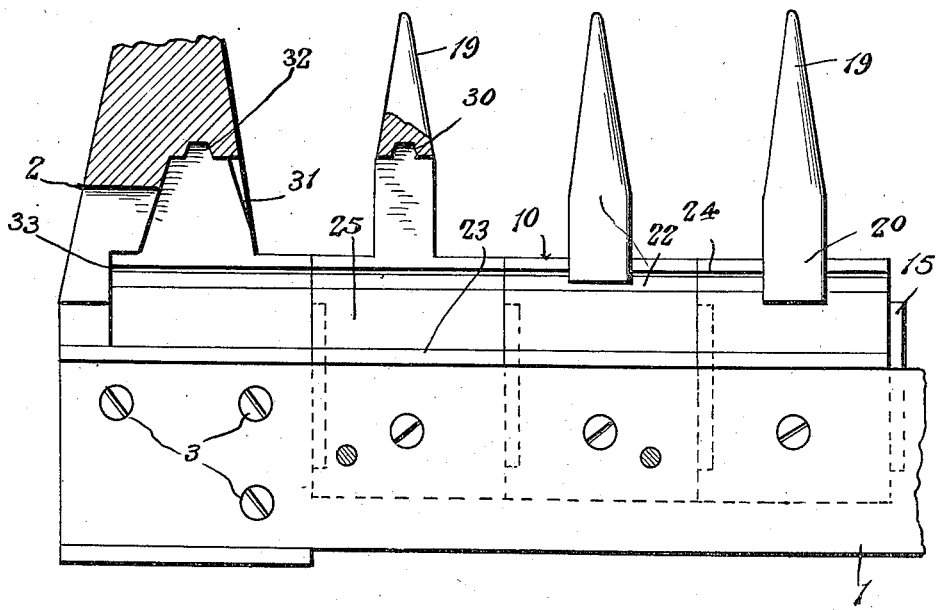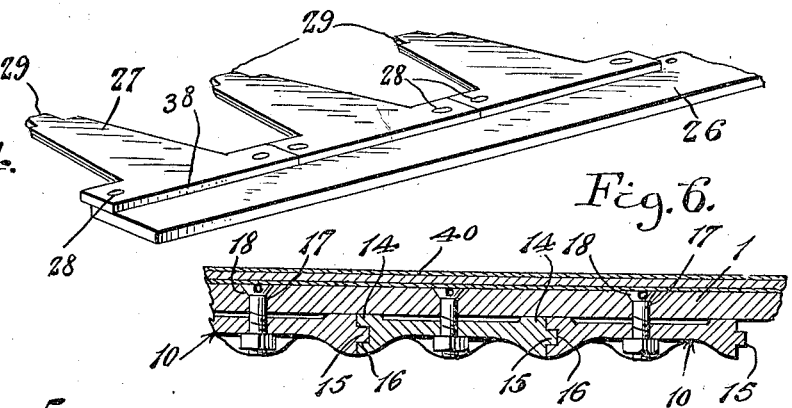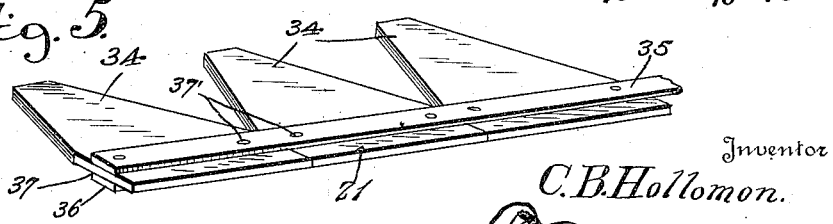

UNITED STATES PATENT OFFICE.

CASEY B. HOLLOMON, OF KENTON, TENNESSEE.

MOWER CUTTER-BAR.

1,310,339.     Specification of Letters Patent.     Patented July 15, 1919.

Application filed April 4, 1916. Serial No. 88,853.

*To all whom it may concern:*

Be it known that I, CASEY B. HOLLOMON, a citizen of the United States, residing at Kenton, in the county of Obion and State of Tennessee, have invented certain new and useful Improvements in Mower Cutter-Bars; and I do hereby declare the following to be a full, clear, and exact description of the invention, such as will enable others skilled in the art to which it appertains to make and use the same.

This invention relates to the cutter bar structure of mowing machines, and an object of the invention is to provide a structure wherein the liability of loss of the guards is eliminated, in that each guard is connected to the guard next thereto by means of a lug and recess so that to remove the guard, it is necessary to remove two of them at a time.

Another object of this invention is to provide a novel cutter bar structure wherein the ledger plates are all attached to a single bar, so that they may be easily and quickly removed for grinding, or other purposes.

A further object of this invention is to attach bars to both the upper and lower surfaces of the sickle bar structure which runs the full length of the sickle, which bars are positioned one above and below the knife head and the blades, which prevents the knife head from breaking and materially strengthens the entire sickle structure.

A further object of this invention is to provide a dust cap which extends over the sickle and catches beneath the inner upper end of the guards, thus holding the sickle in position and forcing it to give a clean cut in all conditions.

A still further object of this invention is to provide dust caps which house the sickle and prevent dirt from entering the cutter bar structure and also provide an oil base which materially decreases the friction of the reciprocatory movement of the sickle.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawings wherein like characters designate like and corresponding parts throughout the several views, and in which:—

Figure 1 is a top plan view of a fragment of the improved cutter bar structure.

Fig. 2 is a cross section through the cutter bar structure.

Fig. 3 is a plan view showing parts in section and parts removed of the cutter bar structure.

Fig. 4 is a perspective view of the ledger plate structure.

Fig. 5 is a perspective view of a fragment of the sickle structure.

Fig. 6 is a fragmentary longitudinal section through the cutter bar structure showing the manner of connecting the guards, and Fig. 7 is a perspective view of one of the guards.

Referring more particularly to the drawings, 1 designates the finger bar of the cutter bar structure, which has the head 2 attached thereto by means of bolts 3. The head 2 of the cutter bar structure includes a forwardly extending point, as is ordinary, and the head further has plates 4 and 5 attached thereto. Lugs 6 are formed upon the plates 4 and 5, and through the medium of these lugs, the cutter bar structure may be pivotally connected to the supporting and operating structure of the mowing machine.

The main body plate or finger bar 1 of the cutter bar structure has a plurality of guards generically indicated by the numeral 10 attached thereto. Each of the guards 10 includes a body plate 11, which is undercut as shown at 12, and is provided with a recess 13 in its upper surface forming ribs 14 along each side of the body, which ribs abut the under surface of the finger bar 1. The teeth of the guard members have a rib 15 projecting laterally from one side of the same which is seated in a corresponding recess 16 formed in the side of the guard next thereto, as clearly shown in Fig. 6 of the drawings, thus connecting all of the guard bodies for preventing any one of the guards from losing or becoming entirely disconnected from the cutter bar structure. The guards 10 are connected to the finger bar 1 by bolts as indicated at 17, which have their heads countersunk in the body bar as clearly shown at 18 in Fig. 6.

Each of the guards 10 has the usual tapered forwardly projecting divider point 19 formed thereon and the rearwardly extending rib 20 which overhangs the sickle generically indicated by the numeral 21.

The upper surface of the body 11 of each of the guards 10 is provided with a recess 22 which extends transversely across the same and alines with the recess formed in the upper surface of the guard next thereto. An upstanding rib 23 is formed upon each of the guards 10 rearwardly of the front upstanding end 24 of the guard, which rib coacts with the front side 24 for forming a recess 25 in which the body bar 26 of the ledger plate structure is seated.

The ledger plate structure includes the body bar 26 to which a plurality of ledger plates 27 are attached. The ledger plates 27 are of usual construction, except that they have transversely extending ears 28 formed on their rear or large ends, which ears are riveted to the bar 26. Tongues 29 project outwardly from the forward ends of the ledger plates 27, and these tongues are seated in recesses 30 formed in the pointed ends 19 of the guard structure 10. The insertion of the tongues 29 into the recesses 30 and also the seating of the bar 26 in the recesses 25 prevent accidental movement of the ledger plate structure and permit of the quick and easy removal of the ledger plate structure from connection with the cutter bar structure proper.

The head 2 of the cutter bar structure is provided with a recess 31 formed therein having an extension 32 which is shaped like and conforms to the configuration of the tongue 29 formed upon the innermost ledger plate 27. The recess 31 is shaped for receiving the innermost ledger plate 27 of the ledger plate structure, and the shoulder 33, formed in the head 2 against which the end of the bar 26 abuts, prevents accidental longitudinal movement of the ledger plate structure.

The sickle structure generically indicated by the numeral 21, which sickle structure is slidably mounted above the ledger plate structure, includes a plurality of blades 34 of the ordinary construction, which may either have smooth edges or corrguated edges, as necessary for the cutting of different types of grain or hay, and upper and lower bars 35 and 36 respectively. The upper and lower bars 35 and 36 extend the full length of the sickle bar structure and are connected to the blades 34 by rivets or analogous fastening devices as indicated at 37. The outer edge indicated by the numeral 37, of the lower bar 36 abuts the inner or rear edge 38 of each of the ledger plates 27, as clearly shown in Fig. 2 of the drawings, for facilitating in guiding the reciprocatory movement of the sickle. The sickle bar has the usual type of knife or sickle head 38 connected thereto, which has the usual ball 39 mounted thereon for connection with the pitman rod used for reciprocating the sickle.

A shield and dust cap indicated by the numeral 40 is supported by the body bar 1 and is provided with an upstruck portion for receiving the upper bar 35 and has its forward end positioned beneath the rearmost portion of the overhanging arms or extensions 20 of the guard teeth 10 as clearly shown at 41 in Fig. 2 of the drawings. The dust cap and shield 40 is provided with an upstruck portion 42 which extends the entire length of the same and receives the upper bar 35 of the sickle structure. A wear plate 43 is positioned directly beneath the plate 40 and a second wear plate 44 rests upon the upper surface of the bar 1 and against the under-surface of the wear plate 43. The dust cap and shield 40 is provided with an upstanding enlarged portion at the head end of the cutter bar structure, which permits of an unimpeded reciprocatory movement of the knife head 38.

The bolts indicated at 45, which fasten the dust cap and shield 42 and the wear plates 43 and 44 to the finger bar 1 extend upwardly through the finger bar, so that to remove any one of the guard structures 10, it is necessary first to remove the shield and dust cap and wear plates 43 and 44, which further prevent or eliminate the liability of accidental loosening or disconnection of any one of the guards as well as adding to the durability of the cutter bar structure.

From the foregoing description taken in connection with the accompanying drawings, the advantages of construction and of the method of operation of the improved mower sickle bar will be readily apparent to those skilled in the art to which this invention appertains, and while in the foregoing description, the principle of the operation of this invention has been described together with various features of construction, combination and arrangement of parts may be altered to suit practical conditions provided such alterations are comprehended within the scope of what is claimed.

What is claimed is:—

A cutter bar including a finger bar, a ledger bar, ledger plates carried by the ledger bar and having their rear ends terminating forwardly of the rear edge of the ledger bar, a sickle bar including teeth and upper and lower strips secured to the teeth at points spaced from their rear ends, said lower strips being mounted on the ledger bar and engaging the rear ends of said ledger plates, a shield secured to the finger bar and extending over said upper strip and said sickle teeth, and upper and lower wear plates secured to said finger bar, said lower plate having its forward edge portion disposed below and in engagement with the sickle teeth, said upper wear plate being disposed rearwardly of the teeth.

In testimony whereof I affix my signature in presence of two witnesses.

CASEY B. HOLLOMON.

Witnesses:
SAM. L. BAYETT,
JESSE THOMPSON.